United States Patent [19]

Marwick

[11] 4,436,695
[45] Mar. 13, 1984

[54] LARGER CONTAINED NUCLEAR EXPLOSION BREEDER REACTOR SYSTEMS

[76] Inventor: Edward F. Marwick, 5149 Dobson St., Skokie, Ill. 60077

[21] Appl. No.: 137,849

[22] Filed: Apr. 7, 1980

Related U.S. Application Data

[63] Continuation-in-part of Ser. No. 40,849, May 21, 1979, Pat. No. 4,344,913, which is a continuation-in-part of Ser. No. 953,166, Oct. 20, 1978, Pat. No. 4,216,058, which is a continuation-in-part of Ser. No. 810,894, Jun. 28, 1977, Pat. No. 4,121,971.

[51] Int. Cl.³ .............................................. G21C 1/02
[52] U.S. Cl. ..................................... 376/317; 376/914
[58] Field of Search ................ 376/102, 152, 317, 914

[56] References Cited

U.S. PATENT DOCUMENTS 3,624,239 11/1971 Fraas ................................... 376/152
3,659,649 5/1972 Dunlap ................................ 376/102
4,121,969 10/1978 Marwick ............................. 376/102
4,216,058 8/1980 Marwick ............................. 376/102

OTHER PUBLICATIONS

Exploding Reactors for Power (1973), Julia Marwick Books, Northfield, Ill. pp. 1–40, E. F. Marwick.

*Primary Examiner*—Sal Cangialosi
*Attorney, Agent, or Firm*—Joel D. Talcott

[57] ABSTRACT

Large falling column-globs of molten sodium are dropped into positions around the center of a large explosion-containing chamber such that most of the effects of neutron-producing bursts, such as high energy photons, neutrons, and highly kinetic ions are attenuated and/or absorbed therein so as to prevent any damage to the chamber. This molten sodium absorbs most of the debris and produced energy of said bursts and is a working fluid by which said debris and such thermal energy is withdrawn from said chamber.

39 Claims, 9 Drawing Figures

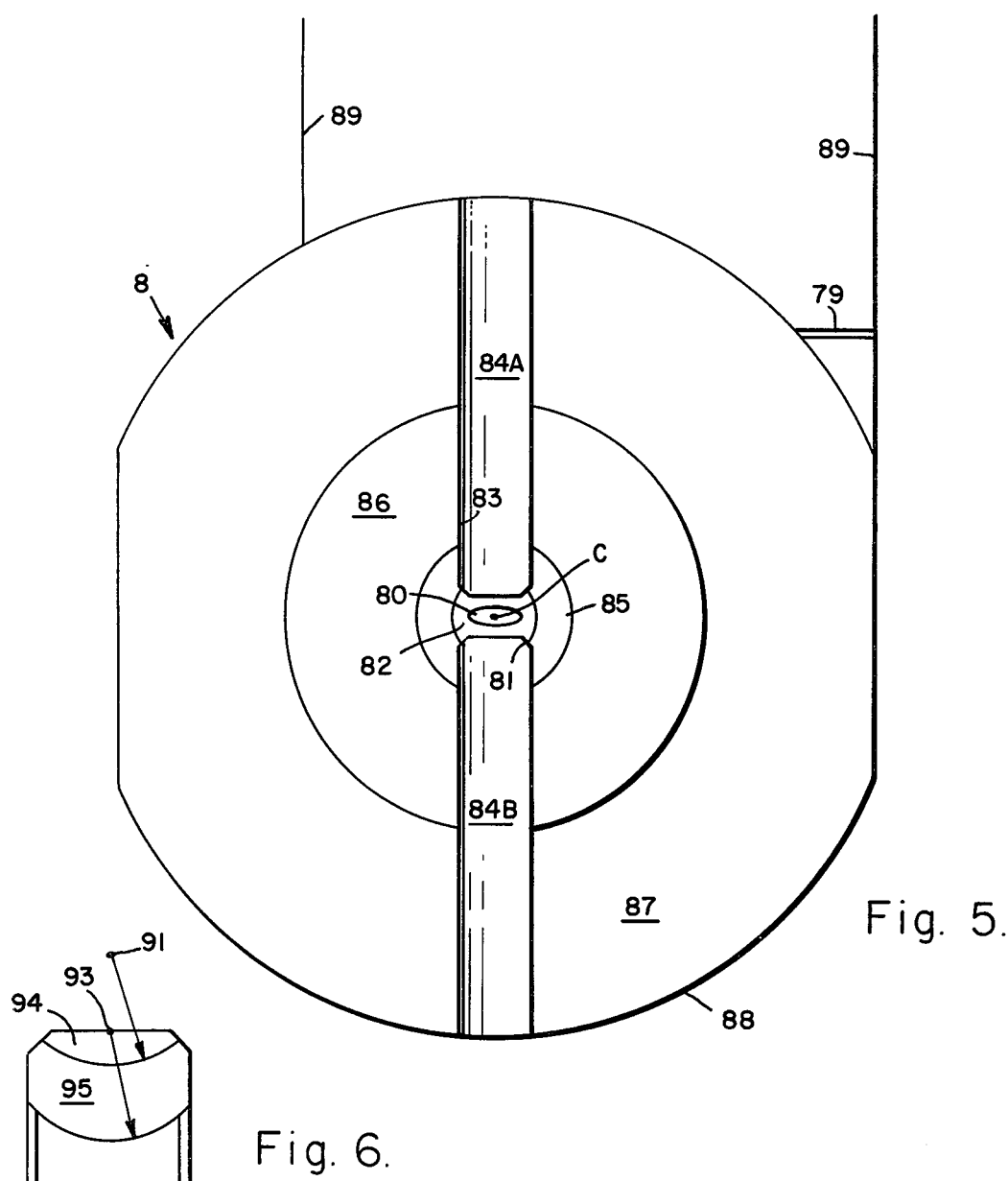
Fig. 5.
Fig. 6.
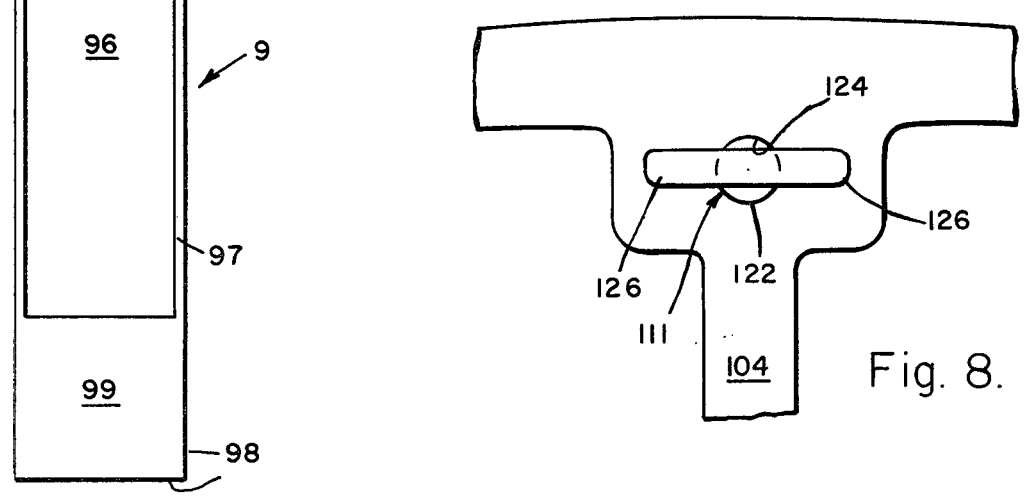
Fig. 8.

LARGER CONTAINED NUCLEAR EXPLOSION BREEDER REACTOR SYSTEMS

This is a continuation-in-part of my application Ser. No. 40,849 filed May 21, 1979, now U.S. Pat. No. 4,344,913, which is, in turn, a continuation-in-part of my application Ser. No. 953,166 filed Oct. 20, 1978 now U.S. Pat. No. 4,216,058 which is, in turn, a continuation-in-part of my application Ser. No. 810,894 filed June 28, 1977, now U.S. Pat. No. 4,121,971, issued Oct. 24, 1978.

This invention pertains to a nuclear reactor system for producing useful thermal energy and valuable nuclear materials, such as plutonium, uranium enriched in $U^{233}$, or tritium, by irradiating suitable target materials with neutrons produced in a large containing chamber by explosions or other neutron-producing bursts occurring seriatim. Useful thermal energy produced by the explosions is absorbed by substantial quantities of very lean molten sodium slurry, much of which is introduced into the chamber in a pattern substantially surrounding the centroidal nuclear explosion. Heat exchangers permit this energy to be extracted and used.

In addition, desired materials are preferably precipitated from the slurry and processed for the fabrication of a large free-falling mass and two high velocity slugs which are introduced into the chamber and concur to produce a fission explosion near the center of the large containing chamber.

In prior art system designs, it has been necessary to pay special attention to two important considerations. These are the positioning of adequate quantities of slurry in suitable locations around the explosion and the fine control of the concurrence of the masses and/or slugs producing the explosion or other burst.

The proper positioning of slurry in the chamber becomes a more serious concern as the magnitude of the contained explosion and of the containing chamber are increased. This is shown by the following illustrative example:

Assume a stream of liquid which enters a substantially evacuated chamber with a downward velocity of 3.0 meters/second has a cross-sectional area of 1.0 $dm^2$ so that 30 liters of liquid enters the chamber each second. In the first second, the liquid falls about 7.9 meters; in the second second, it falls about 17.7 meters; and in the third second, it falls about 27.5 meters. In the third second, 30 liters of liquid will be distributed within a volume of about 275 liters (assuming no sideways scattering) so that the "destiny" of liquid is about 10.9% of what it was when it first entered the chamber.

In my prior reactor designs, this decrease in stream density has been countered by the "bunching" of such stream-sprays. The stream-sprays are given both a downward velocity and a horizontal velocity toward the center-line of the chamber. Note that if the stream-sprays come from an area with a radius of 8 meters from the center-line and are "bunched" into an area which has a radius of 4 meters, the liquid density therein is increased by a factor of four.

As the size of the chamber is increased because of larger contained explosions, the volume of the chamber increases as the cube of the diameter but the surface area increases but as the square of the diameter. The quantity of liquid from a single opening of fixed size that can be falling within the chamber increases as the square root of the diameter. Also the energy and equipment needed to pump the working fluid greater distances with larger chambers increases as the diameter of the chamber.

It may be desirable to increase the flow rate of the slurry to introduce more fluid into the chamber in a shorter time. However, such an increase in velocity of the lean slurry working fluid causes a much greater increase in erosion of conduit surfaces while the slurry falling a greater distance will cause more erosion of the bottom portions of the larger chambers. In the practice of these contained explosion reactor systems wherein the working fluids are of slurries, erosion not only "wears out" the reactor system sooner but also causes build-up of undesirable materials worn from the conduit walls within the slurry and/or the precipitates from the slurry. It should also be noted that the eroded materials in the slurries act to cause a still more rapid rate of erosion. Thus, with more erosion, there is the need for both more frequent and more complex processing of the precipitates and of the sodium remaining which contains materials dissolved therein.

It will be readily recognized that fine and precise control of concurring masses which are to produce a prescribed nuclear explosion, or other, less energetic neutron-producting burst, is vital to the successful operation of a reactor of the type disclosed herein.

If the masses are improperly fabricated or the timing of their travelings are so incorrect that the resulting concurrence of the three masses results in an assembly which is not super-critical, there will be no energetic neutron-producing burst and the masses will fall to the bottom of the chamber. However, if the timing of their travelings is moderately off, there will be an energetic neutron-producing burst of less than desired magntiude but yet of sufficient magnitude to atomize the masses and to produce some useful thermal energy. Likewise, if the velocities of the concurring masses are lower than optimum, the desired explosion will be of lower magnitude than desired and there will be less production of energy and isotopes.

With projectiles being fired to intercept a free-falling mass, the importance of this control consideration is further highlighted. Because of the higher projectile velocities required, a high rate of acceleration must be used for the projectiles. Also, the start and rate of acceleration must be precisely timed with respect to the earlier release of the free-falling mass.

The reactor system of this invention deals with these and other concerns of prior art systems. As in the abovementioned U.S. Pat. application Ser. No. 40,849, the preferred embodiment of this invention utilizes a contained fission explosion with a lean sodium slurry as the working fluid. However, the present system is designed to be a breeder of plutonium instead of $U^{233}$ enriched uranium. The reactor of this invention preferably produces about $3 \times 10^{12}$ joules every 30 seconds. While the explosion is three times the magnitude of the prior application, the power produced is but doubled.

To assure that sufficient quantities of the lean slurry surround the center of the chamber at the instant of explosion or burst, slurry is pumped to the top of the chamber and into large containers. At a prescribed moment before each explosion, a bottom holding means of such containers is removed with sufficient speed to not interfere with the free-fall of the liquid which falls in the form of column-globs of great size.

By providing each column-glob with a sufficient cross-sectional area and preventing the containing bottom holding means from interfering with the liquid by being withdrawn faster than the free-liquid will fall, the effects of liquid viscosity, surface tension, and adhesion of liquid to containing walls is minimal. By using such column-globs in combination with "bunching" spray streams and fine sprays, more working fluid can be positioned nearer the contained nuclear explosion at the required instant in each cycle. Hence, a smaller containing chamber and less pumping power are needed.

Precise control of the projected slugs of this invention is also accomplished. The slugs contain much $UH_3$. By maintaining the slugs at cryogenic temperatures, this $UH_3$ can be maintained in a ferromagnetic state. As a result, very fine control of the velocity of the slugs can be obtained as the slugs are being propelled into the chamber toward concurrence with the large mass by careful regulation of magnetic fields along the initial flight paths of the slugs. This enables the intensity of any neutron burst or explosion resulting from concurrence of the two slugs with the free-falling mass to be very precisely controlled as to time and location as well as magnitude.

Thus, the large contained burst reactor system of this invention has a substantial advantage over prior art systems both in providing means for placing substantially greater quantities of working fluid in close proximity to the centroidal explosion and through a larger and more precise explosion or burst being obtainable as a result of the finer control provided for the concurring slugs.

The reactor system of this invention provides a great technological contribution toward the development of massive fusion explosion systems, such as were disclosed in my application Ser. No. 40,849, by teaching a method by which much greater quantities of working fluid can be positioned in closer proximity to a centroidal nuclear explosion so that an explosion-containing chamber of less volume than previously required can be utilized.

With a fusion explosion system for the breeding of $U^{233}$ enriched uranium with an energy output of $10^{13}$ joules per explosion-cycle, the free-falling column-globs of very lean slurry can be used in order to avoid the need for much larger containing chamber or to avoid more complex and more expensive means of containing explosions in a less voluminous chamber. The use of massive column-globs in an explosion-containing chamber as disclosed in this invention is not limited to nuclear explosion reactor systems, nor is such use limited to the containment of explosions for such column-globs themselves can be a cause of a highly energetic, explosion-like effect. Specifically, a large chamber may be provided with a small opening in an upper portion through which a meteor-like mass can enter and collide with the column-globs which are released at a coordinated time for producing useful thermal energy and desired chemical reactions, such as is disclosed in my U.S. Pat. application Ser. No. 119,516 filed Feb. 7, 1980. Note that the kinetic energy of an object "falling" from near the moon has about 23 times the energy needed to "lift" it from the moon.

A better understanding of this invention will be gained when the following detailed description is read in conjunction with the appended drawings, wherein:

FIG. 5 is a vertical cross-section of a large mass for use in the reactor system of this invention;

FIG. 6 is a vertical cross-section of a slug means for use in the reactor system of this invention;

FIGS. 7 and 8 are fragmentary sectional views showing an alternate latching means for use in the reactor system of this invention.

Figure 1:
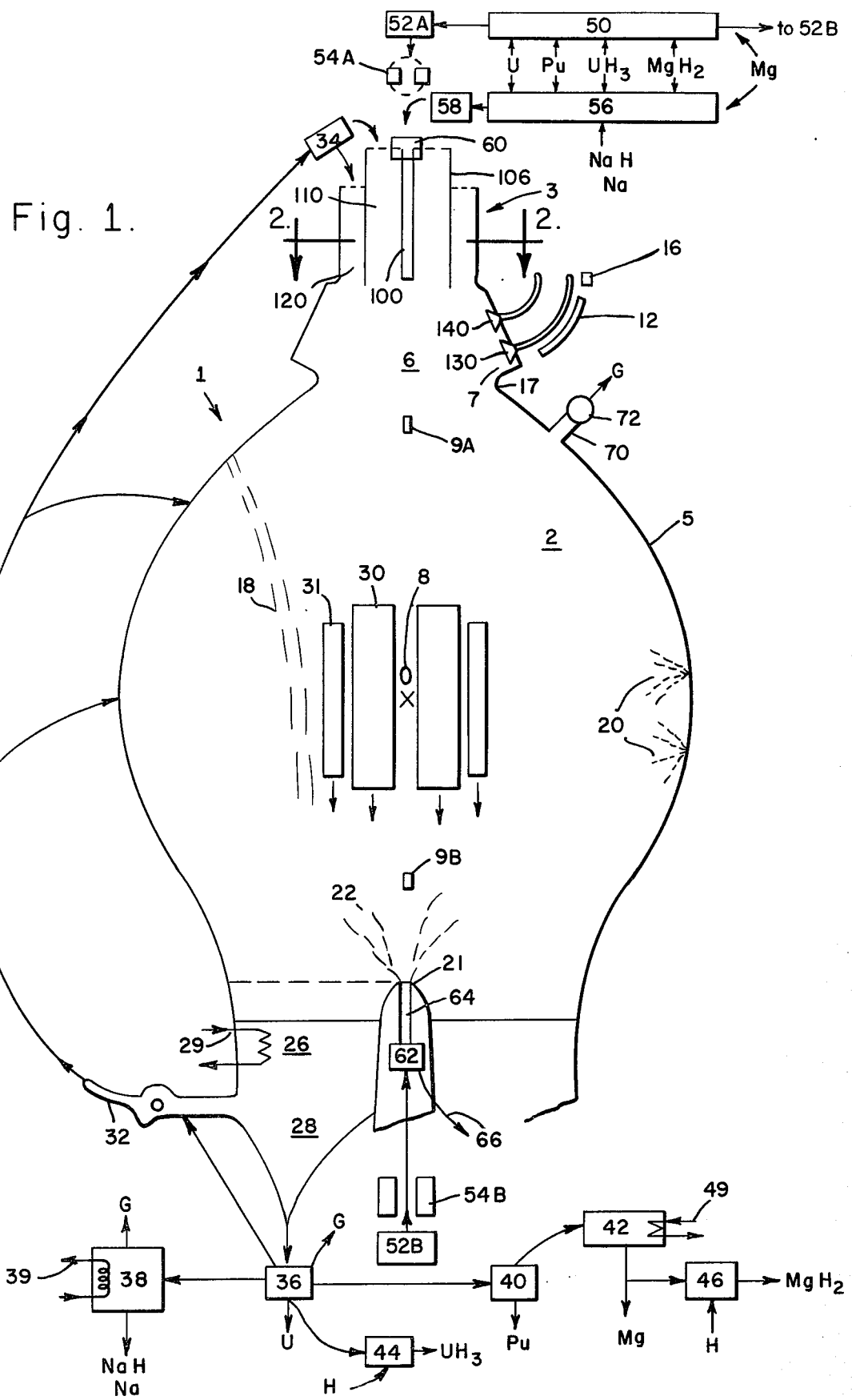
FIG. 1 is a generally schematic view of a reactor system of this invention with an explosion-containing chamber thereof in cross-section.

Referring now to the drawings, a reactor system 1 in accordance with this invention is illustrated in FIG. 1 and has a large explosion-containing chamber 2 which is somewhat ellipsoidal in shape. Highly energetic, neutron producing bursts, which preferably are in the form of nuclear explosions, each having an energy output in excess of $2 \times 10^{12}$ joules, are centered about an explosion point x which is near the center of the chamber 2. The horizontal diameter of the chamber 2 through the point x is about 70 meters, while the highest positioned structure at the bottom portion of the chamber 2 is about 30 meters below point x. The lower-most portion of the fixed structure at the top center of the chamber 2 is about 50 meters above point x.

The explosion-containing chamber 2 has walls 5 which are preferably one to two meters in thickness and are made of a suitable strong steel alloy. Where the walls are closer to point x and in regions where the walls carry numerous conduits or other openings, the walls will be thicker.

In the preferred embodiment of this invention, the contained nuclear explosion or burst results totally from fission reactions produced by concurrence of a large free-falling mass 8 with both a fast upwardly traveling slug 9B and a fast downwardly traveling slug 9A.

At the instant of explosion, the reactor system 1 is protected from the effects of the explosion caused by the more than prompt critical configuration by at least four systems which place molten working fluid into the chamber. Over two-thirds of this working fluid is in the form of free-falling column-globs 30, 31 which are released from glob producing means 3 at the top of the explosion containing chamber 2. Also, there are a great plurality of stream-sprays 18 and even a greater plurality of fine sprays 20. An additional fine spray system is located at the bottom of the chamber and produces fine sprays 22 for the purpose of protecting otherwise exposed tips 21 of the structure to be subsequently described for propelling the upwardly traveling slug 9B. Additional fine spray systems (not shown) may be used to protect the glob producing means 3.

In the operation of the reactor system 1 of this invention, the large free-falling mass 8 is dropped into the chamber and struck by two slugs 9A and 9B. While each of these structures individually is sub-critical, the resulting assemblage becomes more than prompt critical, resulting in the production of energy and neutrons.

In conjunction with the introduction of the mass 8 and slugs 9A and 9B into the chamber, substantial quantities of slurry are introduced into the chamber so as to attain a prescribed configuration at the moment of the explosion or burst. Energy from the explosion is absorbed by the slurry and what shock wave may occur in the most rarified atmosphere of the chamber is attenuated by the distribution of very lean slurry column-globs and sprays in the chamber so that damage to the walls 5 is prevented. The slurry also absorbs debris from the blast. Neutrons and other radiation generated by the burst will also be absorbed by the slurry resulting in the production of useful isotopes and thermal energy. Also, many neutrons will be reflected back into the materials in the mass 8 and slugs 9 wherein desired nuclear reactions will occur.

After each explosion, the heated very lean slurry, containing most of the debris of the explosion, falls into a pool 26 at the bottom of the chamber 2. The bottom of pool 26 is the upper portion of a massive precipitating-heating exchanging system 28 from which useful thermal energy is withdrawn by a plurality of heat exchange means 29. As the slurry sits in the precipitating-heat exchanging system 28, the heavier solid materials tend to settle toward the bottom. Thus, the slurry toward the top will be generally leaner in concentration of actinides and other solids than the slurry lower in the precipitating-heat exchanging means 28. Cooled and somewhat leaner slurry is transported by a plurality of transport means 32 positioned toward the upper portion of the precipitating-heat exchanging means 28 to a feed means 34 which distributes the slurry throughout the liquid column-glob producing means 3. These means 32 also transport cooled lean slurry to the various spray means previously described used for protecting the physical structure of the explosion-containing chamber 2.

Closer to the bottom of the precipitating-heat exchanging means 28, a dense slurry forms. This dense slurry is of cooled molten sodium with heavier particles which are mostly hydrides of actinides, magnesium, fission products and sodium and also include particles of actinide metals, magnesium, and fission products. The slurry is collected and transported to a first processing means 36 wherein the dense slurry is further precipitated. Very lean slurry, which is mostly cooled molten sodium, is drained off the top thereof and transported to transport means 32 to be mixed with the other lean slurry for use as previously described. During processing in the first processing means 36, some gases, such as the fission products krypton and xenon, will be withdrawn by a suitable controlled venting means G.

It should be noted that the first processing means 36 will preferably consist of a substantial number of processing stations inasmuch as processing therein is by the "batch" method and it takes much longer for the processing of a batch therein than the time of a single cycle of the reactor system (on the order of 30 seconds).

After the desired portion of lean sodium slurry has been withdrawn from the slurry in the first processing means 36, a very thick paste remains which is heated. During heating, more gases and vapors are relased and these are transported to a condensing separating and hydriding means 38 wherein the gases are cooled and thermal energy withdrawn by heat exchange means 39. Upon cooling, sodium vapor condenses to molten sodium and/or combines to form NaH, and the remaining gases (mostly hydrogen, krypton and xenon) are withdawn therefrom by a controlled venting means G. The residue remaining in the condensing, separating and hydriding means 38 consists mostly of a mixture of sodium and sodium hydride which is withdrawn therefrom and transported to mass manufacturing means 56 to be used as a solid in the manufacture of large free-falling masses 8 in a manner to be described subsequently.

After much of the hydrogen (from decomposing hydrides) and most of the sodium have been withdrawn from the first processing means 36, it is heated further until a molten alloy of magnesium with plutonium separates above the residue which is mostly uranium. Most of this molten magnesium with plutonium is transported to a plutonium separating means 40. The remaining residue in the first processing means 36 is mostly of uranium metal. A portion of this uranium metal is transported to a slug manufacturing means 50 and to the mass manufacturing means 56 to be used directly in the manufacture of the slugs 9 and masses 8. The remainder is transported to uranium hydriding means 44 which also receives hydrogen gas which has been separated by conventional means from the gases collected by the controlled venting means G. The hydrogen gas is then used to convert the uranium into $UH_3$.

The molten magnesium with plutonium dissolved therein which has been transported to the plutonium separating means 40 is heated until the magnesium is distilled off. That magnesium vapor is transported to a magnesium condensing means 42 where it is cooled by heat exchange means 49 and condensed into molten magnesium. In this process, further useful thermal energy is withdrawn from the magnesium condensing means 42 by heat exchange means 49. Some of the molten magnesium from magnesium condensing means 42 is transported to slug manufacturing means 50 and mass manufacturing means 56 to be used directly in the manufacture of slugs 9 and masses 8. Most of the molten magnesium, however, is transported to magnesium hydriding means 46 wherein $MgH_2$ is produced using hydrogen gas received from the controlled venting means G. This, along with plutonium from the plutonium separating means 40 and $UH_3$ from the uranium hydriding means 44 is transported to the slug manufacturing means 50 and mass manufacturing means 56.

The slugs 9 are manufactured in the slug manufacturing means 50 in a configuration to be described in conjunction with FIG. 6. The downward traveling slugs 9A are transported to an upper slug accelerating means 52A while the upward traveling slugs 9B are transported to a lower slug accelerating means 52B. The slugs 9A and 9B are identical and the upper and lower slug accelerating means 52A and 52B are also substantially identical.

While many means, such as a mass driver may be used for the acceleration of the slugs, in the preferred embodiment, a gas gun will be utilized. One advantage of the use of a gas gun results because the slugs are maintained at cryogenic temperatures so that the $UH_3$ therein will be ferromagnetic. The use of highly energetic magnetic fields in mass driver for the substantial acceleration of the slugs from rest might cause excessive heating within the slugs such that the $UH_3$ would lose its ferromagnetic properties. By using a gas gun as the slug accelerating means, the continued ferromagnetic properties of the $UH_3$ in the slug means can be used for fine control of the final velocities thereof. An upper fine control means 54A and a lower fine control means 54B are preferably in the form of mass drivers and interact with the downward traveling slugs 9A and upwardly traveling slugs 9B, respectively. These control means create adjustable magnetic fields along the flight path of the slug which interacts with the ferromagnetic $UH_3$ to cause small increases or decreases, as needed, in slug velocities such that both the slugs 9A and 9B can occur with the free-falling mass 8 and create an assemblage having the desired characteristics. Of course such fine controlling will be directed by a suitable computer system.

The large free-falling mass 8 is manufactured in the mass manufacturing means 56 and is transported to a mass dropping means 58 for introduction into the explosion-containing chamber 2. Below the mass dropping means 58 there is a complex upper shutter means 60 which at first must be opened wide enough to permit unimpeded passage of the large mass 8. Then it must partially close leaving an opening just wide enough for passage of the high velocity downwardly traveling slug 9A to pass. Finally, it must close completely to protect the dropping and propelling devices thereabove.

A lower shutter means 62 for the bottom slug 9B need not have the complexity of the upper shutter means 60 since it does not need to let through a large mass and therefore only opens to a single, smaller size. However, since it seals off a bottom passageway 64, through which the slug 9B travels, there will be some molten sodium slurry which will fall into that passageway 64. Thus, a drainage means 66 is provided to clear the bottom passageway 64 before the next slug is fired.

Along the upper portion of the chamber 2 there are a plurality of withdrawal conduits 70 through which gases, vapors and very fine droplets and particles are withdrawn to the controlled venting means G when valves 72 are opened.

At the instant of explosion, a plurality of column-globs 30, 31 substantially surround the exploding assembly, having been previously permitted to drop into the chamber 2. These globs are shaped in the glob producing means 3 and when bottom swinging plugs 130, 140 are withdrawn from holding forms or hollows 110, 120 free-fall into the desired configuration.

In the preferred embodiment of this invention, the mass of each of these column-globs is of an order of magnitude between $10^2$ tonnes (metric tons) and $10^3$ tonnes. There are preferably 18 column-globs of which there are 6 inner column-globs 30 that are of greater height than the 12 outer glob-columns 31. It should be noted that both the number and physical configuration of the column-globs would be tailored to the particular requirements of each specific reactor.

The concept upon which free-falling column-globs of this invention is based is that when column-globs are configured in a form which have vertical sides and such column-globs have a great enough cross-sectional area and total volume, the forces, such as adhesion, cohesion and wall-friction, which affect the configuration of a free-falling quantity of liquid will not cause an appreciable alteration in the shape of the column-glob as it free-falls in a chamber which has very little atmosphere. Of course this assumes that the bottom supporting plugs are withdrawn more quickly than the liquid can fall and that once out of contact with the free-falling column-globs, they remain far enough removed to avoid any further contact. Such a configuration makes it possible to place a quantity of slurry in close proximity to the central explosion or burst which is much greater than was possible with all spray systems, thus resulting in enhanced reactor operating characteristics.

Figure 3:
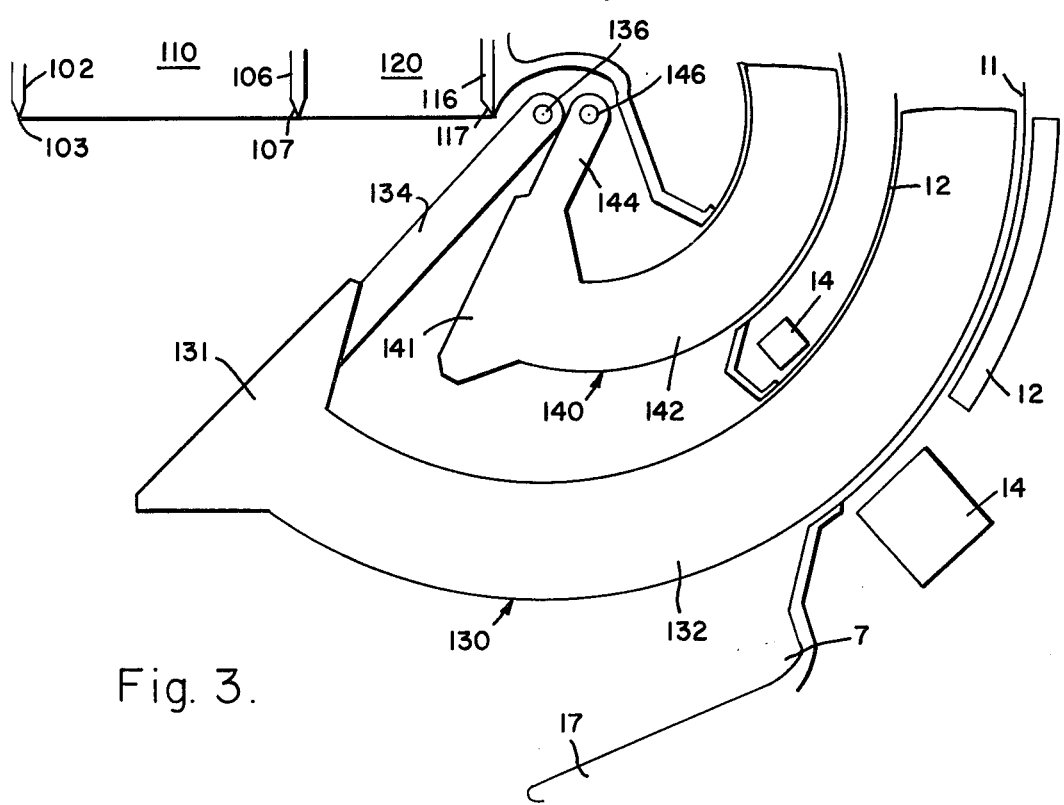
FIG. 3 is a cross-sectional view taken generally along the line 3—3 of FIG. 2.

The swinging plugs 130, 140 are best shown in FIG. 3 and have expanded head portions 131, 141 supported on pivot arms 134, 144 secured to suitable hinges 136, 146. Arcuate legs 132, 142 extend from the heads 131, 141 and fit into arcuate guideways 11 provided in the chamber. These plugs must be moved in a time of less than 2 seconds from a positon holding the slurry within the hollows 110, 120 through an arc of more than 90° to fixed positions within a shielded portion 7 of a neck portion 6 of the containing chamber (FIG. 1) at the instant of explosion. The shielded portions 7 are protected by abutments 17 from a sufficient portion of the shock-blast effects of the explosions to protect the plugs from damage.

Rapid swinging of the plugs may be produced by many varieties of motion producing means. In the preferred embodiment, very strong magnetic attractions and repulsions are produced by accelerating means 12 which interact with the arcuate legs 132, 142 of the swinging plugs. These legs are constructed to serve as solenoids and fit into and travel along the arcuate guideways 11. Note that the accelerating means 12 not only produces forces to quickly accelerate or decelerate the solenoidal portion of the swinging plug into the hollow 11 but must also produce counter-centrifugal forces. The pivot arms may be of solid constructions or may be bifurcated or of I-beam or cellular construction or any other structure permitting the plugs to withstand the mechanical forces related to motion without adding excess weight which could slow plug motion.

When the swinging-plugs 130, 140 are in a position against the bottoms of the hollows 110, 120, respectively, they must be locked in position because a substantial quantity of liquid must be supported. One means for accomplishing this may be a mechanical latching means 14 which may engage an end portion of an arcuate leg 132, 142 of each of the plugs 130, 140 or an opening or recess therein. It may be desired to use one or more latching means 14 for each plug, all of which would be electrically actuated simultaneously. When it is desired to release the plugs, the accelerating means 12 are actuated to drive the plugs against the hollows 110, 120. This will relieve the force against the latching means 14 sufficiently to permit retraction whereupon the accelerating means 12 can quickly withdraw the plugs 130, 140 to release the column-globs 30, 31. The latching means 14 and/or secondary latching means 16 (FIG. 1) may be used to hold the plugs in their protected open positions.

Figure 9:
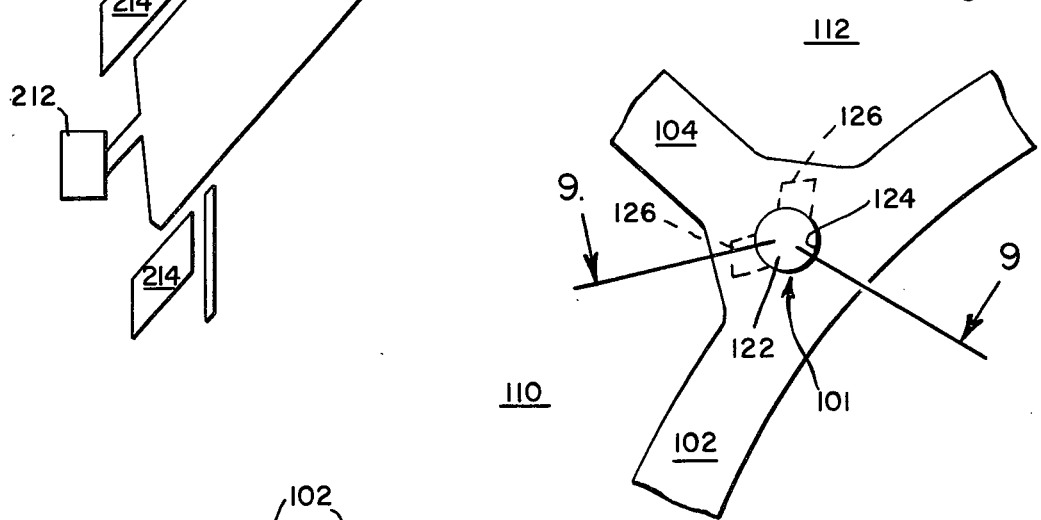
FIG. 9 is a fragmentary sectional view taken generally along the line 9—9 of FIG. 7.
Figure 9:
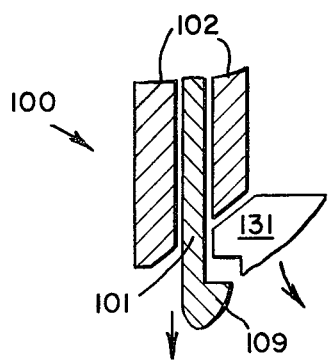

Alternatively or in addition to latching means 14, a plurality of latching means 101 and 111 (FIGS. 7–9) may be used. These latching means lock into position the front portions of the swinging plugs 130, 140 and also aid in the support of the plugs when the hollows are being filled with liquid. Thus, a plurality of latching means will be utilized for each plug, all of which should be actuated simultaneously by electrical, hydraulic and/or mechanical means.

Each of the latching means 101, 111 consists of a solid shaft 122 that is sized to fit into a hollow vertical holes 124. These shafts 122 are preferably constructed of strong steel and are about 20 cm. in diameter and connected to a suitable accelerating and support means (not shown) at their tops which extend above the top of the liquid-containing hollows.

The shaft accelerating means may be of electromagnetic, hydraulic, or mechanical means and each must be able to move its respective shaft downward a distance of about one meter in less than a third of a second. It must also be capable of locking the shaft 122 in place to provide support for the plugs. One or more fingers 126 extend radially outwardly from each of the shafts to engage the heads of the plugs. Note that the shaft has to move quickly so that the swinging plug will be able to move faster than the free falling liquid and that the plugs will not hit the latches of the shafts 101, 111.

When it is desired to release the plugs, the latching means 101, 111 will momentarily pull upwardly upon the plugs so that the latching means 14 can be released. The shafts 122 are then moved vertically downward with sufficient speed to disengage from the plug and move clear from the path of the plugs which are substantially simultaneously moved by the accelerating means 12 to release the column-globs 30, 31. The latching means 14 or secondary latching means 16 (FIG. 1) may be used to hold the plugs in their protected open positions.

After the explosion and after most of the working fluid and debris of explosion has either been withdrawn from the containing chamber 2 or is within pool 26, the swinging plugs may again be moved into position blocking the bottom of the column-glob containing forms. Such movement need not be done nearly as quickly as removal of the plugs from the forms but must be accomplished in sufficient time to permit refilling of the hollows 110, 120 before the next drop.

Although it is desired that the swinging plugs fit as tightly as possible into the bottom of the column-glob containing forms so that leakage will be minimized, it should be noted that some leakage during the quarter-minute or so of time during which the forms are being filled with liquid will be of very little import since the leaking liquid will but fall into the pool 26. It is only necessary that the plugs seal sufficiently to permit the hollows to be filled in the allotted time. It should also be noted that the feed means 34 which fills the hollows 110 and 120 to form the column-globs will be functioning for a period after release of the column-globs, during which spray will be released through the hollows 110, 120 to help protect the upper portion of the chamber 2 and its associated structure from damage and wear.

Figure 2:
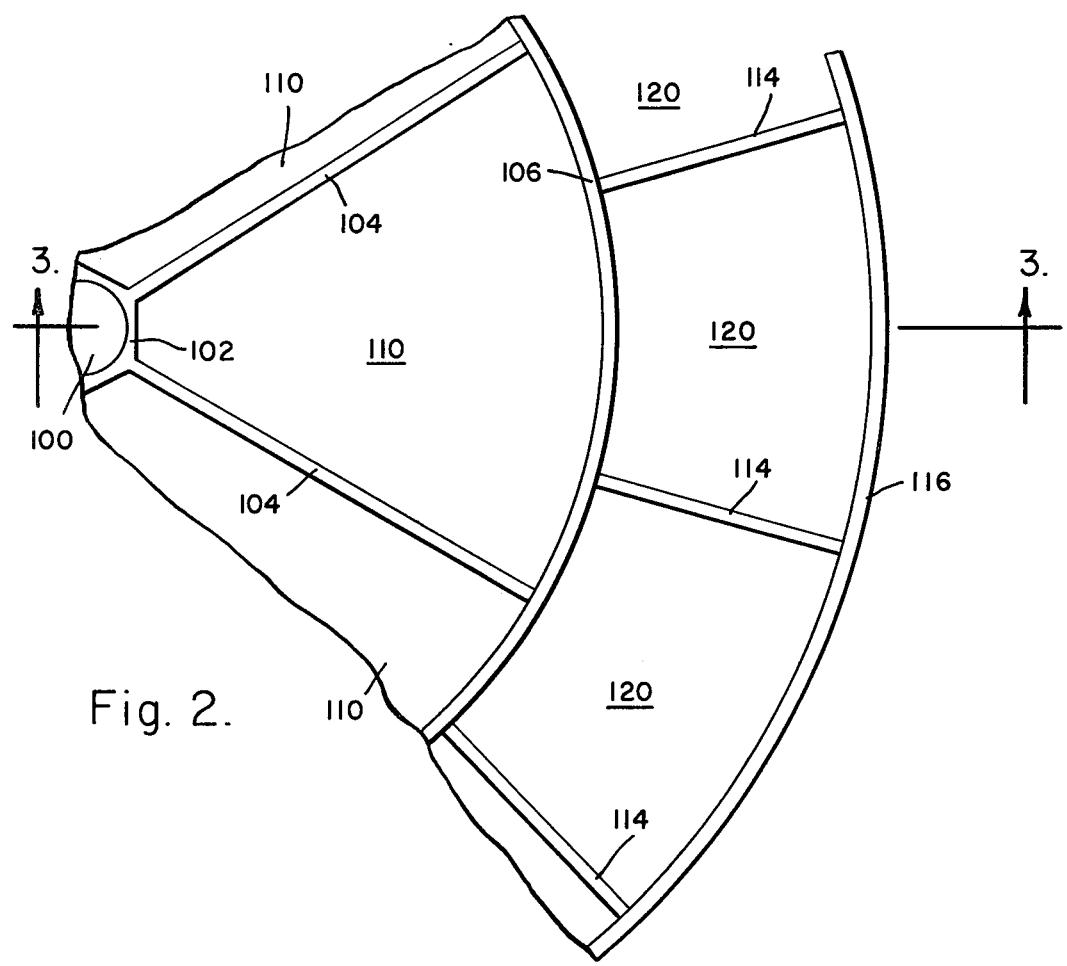
FIG. 2 is a partial cross-sectional view taken generally along through the line 2—2 of FIG. 1.

The cross-sectional configuration of the inside hollows 110 and outside hollows 120 of the glob producing means 3 is shown in FIG. 2. A central passageway 100 is located centrally of the hollows for the purpose of permitting passage of the large free-falling mass 8 and the slug 9A therethrough. Passageway 100 preferably has a radius of 62 cm and hence the mass 8, having a maximum radius of about 60 cm, will be able to fall through the passageway 100 without touching its sides.

The central passageway 100 is separated from the inside hollows 110 by a wall 102 having a minimum thickness of about 18 cm. The straight outside walls forming inner boundaries of the six inside hollows 110 cause the wall 102 to appear generally hexagonal. Side walls 104 extend radially outward from the apices of the hexagon abutting a circular wall 106 to form the inside hollows 110.

The innermost surface of the circular wall 106 is 7.8 meters in distance from the center of passageway 100. The walls 104 and 106 preferably have a thickness of 20 cm. At the corners through which latching means 101, 110 travel through openings 124, the thickness is somewhat less between the boundaries of the hollows 110, 120 and openings 124.

Extending radially outward from the wall 106 are a plurality of walls 114 which extend 4 m. to an outer circular wall 116 to define the outside hollows 120. The walls 114 preferably have a thickness of 20 cm and are distributed to form 12 substantially uniform hollows 120. The outer circular wall 116 is preferably a continuation of the wall 5 of the explosion containing chamber 2 having a thickness of 40 cm.

The corners of the walls should be rounded to a radius of 5 cm or more. The plugs for the hollows will preferably have their corners rounded for optimum fit.

The walls, plugs, etc. should be of strong alloy steel that are erosion and corrosion resistant. The inside hollows 110 should be sufficiently high to permit filling to a height of about 23 meters; while the height of the outside hollows 120 should accommodate a fluid height of about 17 meters. It should be noted that the tips of the walls 102, 106, and 116 all lie in a horizontal plane (see FIG. 3) and form circles. Wall 102 has a tip 103 and is near the inner vertical surface of wall 102 for the outer surface of wall 102 near the tip 103 is formed diagonally at an angle of about 45° with the upper vertical outer portions of the wall 102.

Wall 106 has a tip 107 which is on the center-line of the wall 106 and the lower-most surfaces of the wall 106 make about an angle of 45° with the vertical. Wall 116 has a tip 117 which is about 20 cm farther from the center of the central passageway 100 than are the inner vertical surfaces of the wall 116. The lowermost surface of the wall 116 form an angle of about 45° with the vertical.

The front portions of the swinging plugs are designed to fit into the bottom of the hollows so that leakage of working fluid is minimized.

There are many possible modifications in the swinging plug systems of this invention that the practitioner might elect to use. For example, the plugs have large rear portions of soft iron, or have fixed permanent magnets, or have variable electro-magnets therein that are fed by externally supplied electricity. The magnetic fields from accelerating means 12 could be provided by cryogenic magnetics.

Also, the swinging plug could be accelerated by means other than electro-magnetic, such as mechanical and/or hydraulic means. In fact, alternate plug means design may be used to seal the bottoms of the hollows 110, 120.

Figure 4:
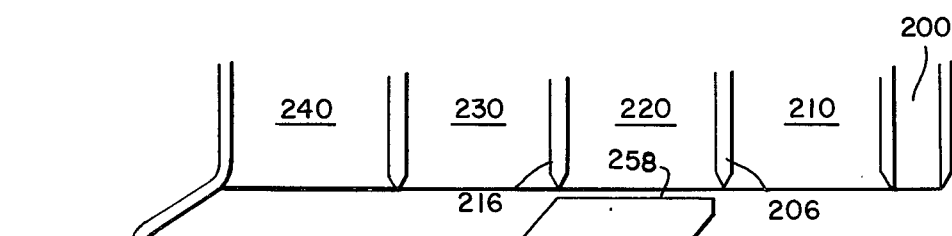
FIG. 4 is a cross-sectional view similar to FIG. 3 showing alternate embodiment of a plug in accordance with this invention.

One such alternative design is shown in FIG. 4 wherein a plurality of hollows 210, 220, 230, and 240 are illustrated outside a central passageway 200. A linearly, diagonally traversing plug means 250 is used to seal the bottom of each hollow. For simplification, however, only one plug means 250 is illustrated. Due to staggering of the hollows, there would be adequate wall space to hold the numerous plug means.

Plug means 250 is shown in a position almost plugging hollow 220. Note that a front surface 258 of the plug means 250 is horizontal and is shaped to fit tightly and minimize leakage. Boundary walls 206, 216 have their lower extremities shaped also for optimum sealing.

When the plug means 250 is engaging hollow 220 in sealing relationship, it is held in place by locking means 214 which may be similar to locking means 14 of FIGS. 1 and 3. The plug means 250 is rapidly accelerated and decelerated as needed by an accelerating means 212 which may be electro-magnetic, hydraulic, or mechanical. Before the explosion, the plug means 250 are withdrawn behind a wall 205 the opening being sealed by a suitable shutter means 260 to protect the plug means 250 from the effects of the explosion.

Note that in such a reactor system using a linear-diagonal plug means, the mass 8 and slug 9A travel through hollow 200 and there are a greater plurality of hollows than in a reactor system using swinging plug means. For example, there might be some six inner hollows 210 which are surrounded by some twelve hollows 220. Those hollows 220 are, in turn, surrounded by some eighteen hollows 230 that are surrounded by the outer ring of twenty-four hollows 240. Such hollows need not all have a cross-section that is a regular hexagon. And the sixty hollows need not all have the same height or cross-sectional area. Likewise, with a reactor system, not all the plug means need be the same type. That is, some could be swinging plugs and some could be linear-diagonal, etc. Note that with a reactor system using all linear-diagonal plug means, there would be no need for the neck 6 of the explosion containing chamber to have a shielded portion 7 or to have the abutment 17 because of the use of a protective shutter 260.

The large free-falling mass 8 of this invention is best shown in FIG. 5 and has a centroidal portion 82 of impure plutonium including a central void 80 of about 300 cubic centimeters and contains the center point of the mass 8 which is designated as C in FIG. 5. The greatest radial dimension of the centroidal portion 82 is 6 cm and the solid volume of portion 82 is about 500 cubic centimeters.

Substantially surrounding the centroidal portion 82 is an inner shell 85 which is of impure uranium metal and has a thickness of about 7 cm. Substantially surrounding shell 85 is a complex shell 86 which is 29 cm thick and comprises a mixture of $UH_3$ and $MgH_2$. This complex shell has decreasing fractions of $UH_3$ at greater distances from point C. Near its innermost portions, the atomic percentage of uranium is preferably about 10% while at the outermost portions of complex shell 86, the atomic percentage of uranium is about 2%.

An outermost thick shell 87 is composed of a mixture of NaH, sodium metal, and some $UH_3$. The atomic percentage of uranium therein averages about 1%. The front and back portions of mass 8 are delineated by the radial distance of about 65 cm from point C.

The main body of the mass 8 is of a cylindrical shape 120 cm across and 50 cm in length. The overall length of the mass 8 is about 130 cm. Extending inward from the front and rear points of the mass 8, respectively, are an upper vertical opening 84A and a lower vertical opening 84B which extend to within about 5 cm of the central point C. These openings are generally cylindrical but terminate in shoulders 81 at the blind ends thereof. The openings 84A and 84B have a diameter of about 11 cm, tapering at the shoulders 81 to a diameter of about 8 cm.

To give the mass 8 greater rigidity the shell 87 is surrounded by a 0.25 cm thick shell 88 of magnesium metal. Also, the openings 84A and 84B are contained by a thin coating 83 of magnesium metal.

To insure that the mass 8 falls without any twist, there are three guide shafts 89 of solid magnesium which are 70 cm long and about three cm in thickness. The shafts 89 are embedded in or firmly attached to the shell 88 and reinforced, such as by struts 79, preferably in uniform distribution about the mass 8 and aligned with the cylindrical portion thereof.

The guide shafts 89 will interface with a complex computer-controlled stabilizing means (not shown) in the mass dropping means 58 which so adjusts frictional forces upon the guide shafts that the center line of the large, free-falling mass 8 coincides with the center-line of the chamber with virtually no rotation or twisting of the mass 8 so that the slugs 9A and 9B can properly travel through the openings 84A and 84B without interference.

Figure 7:
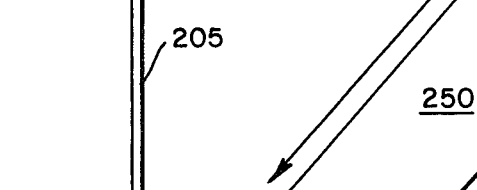

FIG. 7 shows a slug 9 which may serve as either the downward traveling slug 9A or the upward traveling slug 9B. The slug 9 is substantially cylindrical in shape with a maximum length of about 40 cm.

The diameter of the front surface of the slug 9 is about 8 cm, increasing to a maximum of about 10 cm. A forward portion 94 is of impure plutonium metal and is delineated by the front surface of the slug 9, the other boundary being generally spherical with a radius (measured from a point 91 which is some 5 cm in front of a point 93 at the center of the front surface) of 7 cm.

Behind the forward portion 94 is a slug portion 95 which is of impure uranium metal. The front surface of slug portion 95 coincides with the back surface of forward portion 94 and its back surface is delineated by a radial distance of 7 cm from point 93. The side boundary, except for a little notch in the frontal area, is the curved surface of the slug.

Much of the remaining portion of slug 9 is a slug portion 96 which is of $UH_3$. This slug portion 96 is substantially cylindrical in shape with a diameter of about 9.4 cm. Surrounding the exterior of slug portion 96 is a cylindrical shell 97 about 2 mm thick of $MgH_2$ which is surrounded, in turn, by a 2 mm thick outer shell 98 of magnesium metal.

The back surface of slug portion 96 is some 30 cm from the front surface of the slug through point 93. Behind portion 96 is cylindrical portion 99 which is by weight about one-third $UH_3$ and about two-thirds $MgH_2$. Cylindrical portion 99 has a diameter of about 9.8 cm and a height of about 9.8 cm. The side and back portions of portion 99 are also surrounded by the magnesium shell 98.

It should be noted that the slugs 9A and 9B are designed to fit into the openings 84A and 84B of the mass 8. Specifically, the maximum diameter of the slugs is 10.2 cm while the minimum diameter of the openings 84A and 84B is 11.0 cm. Thus, there is a leeway of about 4 mm on either side for the center-line of the slug's flight path which will accommodate any deviation from the center-line of the openings.

A substantial advantage of the reactor system of this invention lies in the fact that the slugs 9, when fired into the mass 8, are mostly at cryogenic temperatures. Just after their manufacture, the slugs are transported to a cryogenic cooling chamber (not shown) near the accelerating means 52A, 52B for that slug. When the slugs have an average temperature of about 100° K., they can then be quickly placed in the accelerating means and fired.

While being fired (very rapidly accelerated), the outer shell 98 will be heated up. In fact, the outer surface of the shell 98 may be so heated that it is in a liquid state. Note that the shell 97 acts to somewhat insulate the heated outermost shell 98 from the still cryogenic slug portion 96 of $UH_3$. Since $UH_3$ is ferromagnetic at 100° K., fine control of slug velocities can be obtained by the upper and lower fine control means 54A and 54B. For such control, the controlling computer system for the reactor must receive input indicative of slug position and velocity and compare these with programmed values. Any errors can be corrected by regulation of the magnetic fields of the fine control means 54A and 54B such that the correct concurrence of the mass 8 with both the slugs 9A and 9B occurs.

The assembly of mass 8 with the slugs 9A and 9B is designed so that most of the fissioning occurs near to the point C (FIG. 5) and a very low proportion of neutrons escape from the assembly. Most of the fissionable material is within centroidal portion 82 of the mass 8 and the forward portion 94 of the slugs 9. Of those neutrons that travel beyond these inner portions, those that do not cause fast neutron fissioning of $U^{238}$ within the inner shell 85 of mass 8 and/or slug portion 95 will either be reflected back, mostly by the hydrogen in the complex middle shell 86 of mass 8 and slug portion 96 or will be captured by $U^{238}$ in these regions.

$MgH_2$ is used in the mass 8 and slugs 9 because it is, by atoms, two-thirds hydrogen and because magnesium has a very low neutron capture cross-section. In addition, the magnesium can be used in the processing as a solvent for plutonium.

The concentrations of fissile materials within the centroidal portion 82 of the mass 8 and the forward portions 94 of the slugs 9 is so designed that when the programming of the slugs 9A and 9B is correctly done, the assembly of mass 8 with the slugs 9A and 9B becomes more than prompt critical when the points 93 are about 6 cm from the point C. Since there are many spontaneous fission neutrons from the actinide atoms and especially from $Pu^{240}$, the portions 82 and 94 will be so heated from fissionings therein that at the instant that the forward slug portions 94 strike the surface of centroidal portion 82, they will be in a molten phase.

The momentum of the slugs will squeeze the front and back of the molten centroidal portion 82 into the central void 80. While this is happening, the inner shell 85 and slug portions 95 act as tampers. Note that as the central void 80 is shrinking, the "k" of the assembly is rapidly increasing and the magnitude of fissioning is increasing more rapidly.

If the velocity of the slugs is fast enough, an explosion of the desired magnitude will occur. A slower impact velocity will produce an energetic burst yielding thermal energy and neutrons while being substantially less energetic than an explosion.

Of course, in the practice of this invention, great care is always taken to avoid critical or near critical assemblies, except when desired near the explosion point x (FIG. 1). Until the exact velocity for the desired magnitude of reaction has been determined, lower velocities will be used even though there will be resulting reactions of less than desired magnitude.

The column-globs of this invention serve the function of placing large quantities of very lean slurry in close proximity to the exploding assembly. Regardless of the design or efficiency of a spray system, it is not possible to achieve the desirable material concentrations near the explosion as is provided by the use of the column-globs. By having large quantities of slurry nearer to the exploding assembly, greater attenuation of the effects of the explosion are obtained than would be the case if the slurry were more evenly distributed throughout the explosion chamber as with an all spray system. Large quantities of cool slurry are needed to absorb the energy of the explosion so that the temperature of the slurry coming in contact with the chamber's wall or in contact with the walls of heat exchange means 29 is not excessive. It should be noted that the plasma produced by the explosion is first cooled into vapor and then into condensed materials by the massive cool column-globs. What little vapor escapes beyond the column-globs will condense upon the cool lean slurry of the sprays 18, 20, and 22 so that no hot vapor will come in contact with the walls of the explosion chamber.

Even though some of the neutrons which escape beyond the outer shell 88 are reflected back towards the assembly and some of those neutrons beyond the outer shell 88 will be captured by $U^{238}$ in the surrounding very lean sodium slurry, the practitioner of this invention might elect to improve neutron economy by the following:

(a) Use slurry with more actinide in the falling columns of working fluid nearest the exploding assembly. Such practice would be a modified application of the invention as disclosed in my U.S. Pat. application Ser. No. 953,166. By such procedure, many of the neutrons escaping from the assembly that would have been captured by sodium atoms will instead be captured by $U^{238}$ atoms in the denser slurry.

(b) Make the mass and slugs larger. Thus, fewer neutrons will escape beyond the limits of that enlarged exploding assembly. For example, the outermost shell 87 could have an outside diameter of 1.4 meters and a maximum length of 1.5 meters while cylindrical portion 99 could be enlarged so that the length of the slugs is 50 cm. Of course, if an enlarged mass is used in the practice of this invention, there will need to be adjustments made in the location and sizes of column-globs used therein.

The impure plutonium used in the practice of this invention will be about 90% plutonium and very roughly about a couple percent each of uranium, neptunium, trans-plutonium actinides, fission products, and miscellaneous atoms which includes materials worn from walls, magnesium, and hydrogen.

There could be considerable variation in the isotopes of plutonium in the impure plutonium used in the practice of this invention, but very roughly the average percentages should be about: $Pu^{238}$ 2%, $Pu^{239}$ 60%, $Pu^{240}$ 23%, $Pu^{241}$ 10%, $Pu^{242}$ 4%, and others 1%.

Although the isotopes $Pu^{238}$, $Pu^{240}$, and $Pu^{242}$ are usually thought of as fertile isotopes, that is, to slower neutrons they absorb a neutron and become a fissile isotope, they will fission to fast neutrons much more readily than $U^{238}$. In fact, by itself, $Pu^{238}$ has a critical mass on the same order of magnitude as does $Pu^{239}$.

To faster neutrons, $Np^{237}$ is also most fissile and this atom, which is somewhat parasitic in slow neutron reactors (since it takes two neutrons to transmute it into fissile $Pu^{239}$), is in this reactor a non-parasitic atom. If spent enriched uranium is used as a source of uranium for the practice of this invention, there will be more $Np^{237}$ formed since the "parasitic" $U^{236}$ therein will transmute into $Np^{237}$ since $U^{237}$ has a half-life of less than a week. However, it should be noted that $U^{236}$ is more fissionable to fast neutrons than is $U^{238}$ and that much $Np^{237}$ is a result of the decay of $U^{237}$ which is formed by the stripping of a neutron (by a very fast neutron) from $U^{238}$.

Of course, with the very dense fast neutron flux within the centroidal portion 82 and forward portions 94 and within the inner regions of the inner shell 85 slug portions 95 there will be much fissioning of such short-lived isotopes as $U^{237}$, $Np^{238}$, $Pu^{243}$.

The impure uranium used in the practice of this invention is perhaps about 95% uranium and contains less than 1% plutonium. Much of the remaining impurities will consist of fission products and magnesium.

Most of the neutron reactions occurring in the practice of this invention are either fast neutron fissionings or the capture of a neutron by $U^{238}$. A few of the slowed down neutrons will be reflected back into the centroidal portion 82 and the forward portions 94 where a higher fraction of them will be captured by plutonium atoms resulting in either fissionings or transmutations into plutonium isotopes of higher mass number.

The advantages of a very fast neutron reactor system is that the fraction of neutron captures is low compared to the fraction of fissionings. This is true for all actinides. With this reactor system of those fast neutrons that are so moderated into slower neutrons perhaps over 90% are captured by $U^{238}$ atoms and hence decay into $Pu^{239}$. Also with fast neutron fissionings, the average number of neutrons produced per fission is higher than with slower neutron fissionings.

Of the actinides within this preferred embodiment at the beginning of operation, perhaps some 5% are plutonium atoms while about 95% are uranium (this assumes that no neptunium or trans-plutonic atoms are purposely added). As the system is operated for some thousands of cycles, the percentage of plutonium increases and the percentage of uranium decreases. Also, there will be a build up of fission products, neptunium and trans-plutonium actinides therein.

Very rough calculations show that in a year there will be more than a million explosion-cycles and that about 37 tonnes of fission products will be produced. About 18 tonnes more of plutonium will have been created therein than was fissioned or transmuted.

Since large quantities of plutonium are within the slurries (most of which is in slurries that are standing with slow precipitations therein) and perhaps larger quantities of plutonium are in the processing and manufacturing means, the total inventory of plutonium in the whole reactor system is on the order of about 36 tonnes. Thus, the reactor system has a plutonium doubling time of about two years.

Of course, the fission products within the system should be cleaned out of the system frequently. Those fission products that are soluble in the molten sodium lean slurry are of less import since the lean slurry has an average of very little neutron flux. Perhaps the major source of such neutron flux is from delayed neutrons and/or neutrons born of fissions caused by delayed neutrons. The fission products which are most insoluble in molten magnesium and hence are found with the uranium are a greater problem since they are exposed to a much greater flux of neutrons when within the inner shell 85 of the mass 8 and slug portions 95. They are of a lesser problem when they are within the complex middle shell 86 of mass 8 and slug portions 96 because of the lower flux of neutrons thereabout.

Perhaps as much as a quarter of the fission product mass can be separated from the system by the processing of the gases which are withdrawn by the controlled venting means G. This could include the metals rubidium and cesium whose vapors have much higher vapor pressures than does sodium.

This invention does not concern itself with the chemical or other means which would be employed to process the fission product gases or vapors, and/or to separate out the fission products from the impure uranium and the impure plutonium for in all these cases the art is well developed. Likewise for the separation of the neptunium and trans-plutonic actinides as well as the materials that are worn from the various walls.

The ultimate use of the excess plutonium produced by this invention could be either as mixed oxide fuel or in new reactors of design like the preferred embodiment. The mixed oxide use of such plutonium could be either in fast neutron reactors wherein the plutonium is about 20% of the actinide or in light water slow neutron reactor systems wherein the fissile fraction of actinides is about 3%.

An abbreviated and simplified sequence of operations of a 30 second cycle of the preferred embodiment of the reactor system of this invention is as follows:

| (time of 0.0 seconds is instant of maximum energy production) | |
| --- | --- |
| −20.0 sec. | All of the swinging plugs 130, 140 are locked into a tight fit onto the bottoms of the hollows 110, 120; feed means 34 begins to fill up the hollows. |
| −10.0 sec. | Mass dropping means 58 starts moving mass 8 into position for dropping. |
| −6.0 sec. | Upper shutter means 60 begins to open. |
| −4.0 sec. | Mass dropping means 58 releases mass 8. |
| −3.5 sec. | The swinging plugs 130 for the inner hollows 110 are opened. |
| −3.4 sec. | The swinging plugs 140 for the outer hollows 120 are opened. |
| −3.3 sec. | The first of the stream-sprays 18 enter the explosion containing chamber 2. Valves 72 are closed. |
| −2.0 sec. | Last of stream-sprays 18 begin to enter chamber 2; the stream-sprays from feed means 34 are turned off; the first of the fine sprays 20 enter the chamber 2; the first of fine sprays 22 enter chamber 2. |
| −.70 sec. | The slugs 9A and 9B begin their acceleration-average acceleration is about 2,000 m/sec$^2$. |
| −.10 sec. | The swinging plugs are locked into open position; the slugs 9A and 9B are now under control of the fine control means 54A and 54B respectfully. |
| −.04 sec. | Slug 9A enters chamber 2. |
| −.03 sec. | Slug 9B enters chamber 2. The most speedy inner-directed portions of fine sprays 22 start to enter bottom passageway 64. |
| −.01 sec. | Shutter means 60 and 62 both closed tight. |
| −.0001 sec. | Explosive assembly becomes critical. |
| 0.0 sec. | Instant of maximum energy production. |
| 0.1 sec. | Sprays 18, 20, and 22 terminated. |
| 1.0 sec. | Drainage means 66 opened. |
| 2.0 sec. | Valve 72 opened. |
| 4.0 sec. | Bottom pool 26 at highest level; swinging plugs are unlocked and begin traveling toward closed positions. |
| 10.0 sec. (−20 sec.) | All of swinging plugs are locked into a tight fit onto the bottom of the hollows, drainage means 66 closes; valve 72 closes. A new cycle begins. |

Note that only about 0.06 seconds of time is available for the fine adjustment in velocity needed to obtain the desired concurrence of the slugs 9A and 9B with mass 8.

This invention of large falling column-globs of working fluid in the containment of nuclear explosions is not limited to the specific embodiment of an all-fission explosion assembly as herebefore described. Nuclear explosion assemblies similar to those disclosed in U.S. Pat. applications Ser. Nos. 544,178; 953,166; 810,894; and 040,849 and/or my U.S. Pat. Nos. 4,121,969 and 4,121,971 (both issued Oct. 24, 1978) could be used.

Likewise, this invention is applicable for all-fusion or fission-fusion explosion containment.

An all-fusion explosion is ecologically attractive since there is a minimal quantity of radioactive debris therefrom. There would be large quantities of tritium produced and consumed therein. Such tritium is not debris but is valuable as a fusion fuel or as a radioactive isotope with uses including radioactive lumination.

When the common definition of nuclear fusion is reactions involving atoms of low atomic weight fusing together to form an atom of higher atomic weight, such reactions as:

(1) most energetic $n+D \rightarrow n+n+p$ (2) $n+Li^6 \rightarrow He^4 + T$ and (3) energetic $n+Be^9 \rightarrow n+n+He^4+He^4$ are fission reactions even though they are not like those reactions common in actinide fissioning. Note that with such reactions as (1) and (3) energetic neutrons are multiplied into a greater number of slower neutrons. Such slower neutrons can react in reaction (2) to produce tritium. Thus, most designs for all fusion reactor systems have more tritium produced therein than is consumed in the most easily obtained fusion reaction:

(4) $D+T \rightarrow He^4(3.5\ Mev)+n(14.1\ Mev)$

In an all fusion reactor system, some of those most energetic neutrons will reach the containing walls and therein produce various radioactive atoms. In terms of total energy, such all-fusion reactors are most wasteful. It takes a single neutron to produce tritium and it also takes a single neutron to produce a fissile atom of either $U^{233}$ or $Pu^{239}$. The use of tritium is, for example, reaction (4) results in only about a tenth as much energy as is formed in the fission of either $U^{233}$ or $Pu^{239}$. In current light water reactors, because of some fast neutron fissioning and of the fissioning of atoms bred from the fission-born neutrons, the effective energy from each neutron in fission systems can be said to be more than twenty times the energy obtainable from fusion system use.

Thus, the great advantage of the fusion-fission hybrid can easily be seen—the synergetic combination of neutron-rich production of fusioning with the production of fissile isotopes and of some fissioning therein. Although there have been designs of magnetically-confined fusion systems with blankets of fertile material to be neutron irradiated therefrom, the studies of such designs indicate that the energy and fissile production from such systems is far too expensive. Likewise, the systems wherein there are micro-explosions of small pellets have also indicated that their energy and fissile production will be far too expensive. A main expense of such small inertial confinement fusion systems is the cost of the most powerful energy pulse means needed to ignite the small pellet into a micro-explosion.

In many of the micro-explosion fusion-fissile-breeding systems, the material to be neutron irradiated is behind a "first wall" of the containing reactor system. In addition, often there has been a complex cooling system used to cool the fixed material being irradiated.

For a fusion-fissile-breeding reactor system that is economically viable, the following conditions are needed:

(A) The explosion should be of great enough magnitude so that the cost and operating expense of the ignition means is not proportionally too great.

(B) The explosions should be frequent enough. This means that the power output of the system will be on the order of $10^{11}$ watts or greater.

(C) There should be an effort to minimize actinide fissionings within the system since there are so many more neutrons produced per unit of energy by fusion reactions than by fission reactions, and a prime purpose of the system is the breeding of fissile atoms which require neutrons.

Towards such a system, these specific details seem desirable:

(1) Most powerful energy pulses at about the same instant ignite a small centroidal portion of fusionable material such as solid deuterium tritide. Those most powerful energy pulses could be of photons (such as are produced by lasers), of most energetic electrons (E-Beam) and/or of ions and neutralized energetic particles. Ignition is produced by the great compression of material due to impact in a time frame measured of an order of magnitude of a nano-second and/or by the placing into a very small volume of fusionable material a tremendous quantity of energy. This will be sufficient for some $10^{20}$ atoms of compression-densified fusionable material in a nano-second to receive so much energy that their average energy is about 20 Kev. That energy, in total, is about $3 \times 10^5$ joules and perhaps within those $10^{20}$ energized atoms there would be some $10^{19}$ fusions. From the very short distance traveling $He^4$ ions produced by reaction (4) therein, there would be over $52 \times 10^5$ joules added to that small volume of energized atoms. Of course, most of that energy will have spread outwardly so that say $10^{21}$ atoms are now energized into fusionable energies.

Thusly, with more fusions and still more atoms being energized into fusionable energies in a couple of nano-seconds, the small quantity of fusion-ignited atoms can increase over a thousand-fold. In fact, because of the dense concentration of fusionable material, the average energy of such ignited fusionable atoms will increase so much that there can be either of these reactions:

(5) $D+D \rightarrow H(3.02\ Mev)+T(1.01\ Mev)$ (6) $D+D \rightarrow He^3(0.82\ Mev)+n(2.45\ Mev)$ The tritium produced in reaction (5) will quickly fuse by reaction (4) while the $He^3$ from reaction (6) will fuse by this reaction:

(7) $He^3+D \rightarrow He^4(3.67\ Mev)+H(14.67\ Mev)$

Note that all of the energies from reactions (5) and (7) are in ions which transfer their energies to surrounding atoms in distances on the order of a millimeter. Note that, on the average, neutrons travel many centimeters before much of their energy is transferred to other atoms. Many of those fusion-born neutrons from reactions (4) and (6) could cause reactions (1) and (3); and hence there could be a multiplying of neutrons.

(2) The small ignited volume is of solid DT and most of the nearby surrounding fusionable material is also solid DT. But, further from the center of ignition, the fraction of tritium becomes less and less and at a distance of about 6 mm from the center, the fusionable material becomes solid deuterium. Thus, if there is desired to have a total fusion energy of about $10^{12}$ joules, the mass of tritium needed is less than a tenth of a gram while over 3 grams of deuterium are consumed in fusion reactions and by reaction (1).

(3) The centroidal fusionable material is substantially surrounded by neutron multiplying materials such as berrylium metal, $BeD_2$, or even heavy metals such as lead and/or bismuth. If it is desired to produce an excess of tritium, natural lithium or lithium depleted of $Li^6$ could be used for too fast neutrons, there is this reaction:

(8) very fast neutron $+ Li^7 \rightarrow Li^6 + n + n$

Although this layer is predominantly for the multiplication of neutrons, it also acts to so slow down those fusion-born neutrons that there are very few fast neutron fissionings of either $U^{238}$ of $Th^{232}$. However, some of the neutrons will be reflected back into the fusionable material where there will be some of this reaction:

(9) $n + He^3 \rightarrow T + H$ (4) Surrounding this layer of neutron multiplying material is the layer of fertile atoms which upon neutron irradiation transmute into fissile atoms. The capture of a neutron by $Th^{232}$ (99.99 + % of natural thorium) results in the production of $U^{233}$ which is better for use in light water reactors than $U^{235}$. A capture of neutron by $U^{238}$ (99.28% of natural uranium) results in the production of $Pu^{239}$ which is better for fast neutron reactors.

Although it would be theoretically best to have most purified fertile material in this layer even with as large a quantity of fissile atom production as say 200 grams per mostly fusion explosion, this is too small a quantity to be profitably extracted from 2 tonnes of fertile material constituting this layer (0.01%). Thus the fertile material will be reused with irradiated atoms therein again and again. The neutron irradiation of such slightly fissile, fertile material will result in some fissioning. Also, there will be some transmutations such as 27 day half-life $Pa^{233}$ into $U^{234}$ which is more fissile to fast neutrons but will capture slow neutrons and transmute into fissile $U^{235}$.

Although such isotopes as $Th^{233}$, $Pa^{234}$, and $U^{239}$ have short half-lives, they are most fissionable to neutrons of intermediate energies. Thus, later-born neutrons from the mostly-fusion explosion will cause some fissioning in these just-born isotopes. Rough calculations indicate that, with optimization of the various parameters, the energy from the desired all-fusion explosion for the production of fissile isotopes will, in fact, be about two-thirds fusion and one-third fission energy. Hence, the product will be about 90% $U^{233}$ uranium if thorium is the fertile material and about 90% $Pu^{239}$ plutonium if depleted uranium is the fertile material.

(5) Although the addition of large quantities of regular hydrogen atoms (protium) in the form of hydrides will make the recovery of tritium and deuterium most difficult, the use of much protium will mean that the quantities of fertile materials needed in the blanket described in (4) would be greatly lessened. The fertile material could mostly be in the form of such hydrides as $UH_3$, $ThH_2$, and $Th_4H_{15}$. Surrounding the blanket containing fertile materials could be a blanket which contains much NaH and reflects many neutrons back towards the fertile material. The advantage of protium is more than due to its very high neutron scatter cross-section–it is by far the best moderating atom–and it is important that these neutrons are moderated down to energies whereat they are readily captured by fertile atoms.

Rough calculations indicate that for a system wherein there is about 200 grams of fissile atoms produced each explosion that only about 0.1 gram of tritium and perhaps about 10 grams of deuterium need be "lost" per explosion cycle by the use of much protium. Of course the deuterium is recoverable by complex processing of the hydrogen within the system. The tritium decays into $He^3$ which can be easily separated out of the system with the other inert gases. The 0.1 gram of tritium needed could be produced in another reactor system.

(6) The working fluid of such a reactor system should be of an alkali metal, more specifically of molten sodium. As in this invention with its all-fission embodiment, the molten sodium will be as a very lean slurry containing actinides, hydrides, fission products, etc. If there is a desire to produce much tritium, there could be much lithium within the working fluid and/or within the blankets.

If water is used as the working fluid, there would be the "loss" of the tritium and deuterium used in the centroidal fusioning portion and there would have to be the refining of the material used for the neutron multiplying blanket. If BeO is used in this blanket, the neutron multiplying would be less than with a metallic beryllium blanket. A major disadvantage in the use of water as the working fluid is in the fact that heated water becomes steam. Such steam would exert a great pressure upon the containing chamber's walls. Before the next explosion, the vapor pressure within the chamber should be reduced to a few mm of mercury to avoid the excessive transmission of shock-blast waves to the containing chamber's walls.

(7) The ignition means for the contained mostly fusion explosion is much different than those used in military applications. Within the reactor system, it is best to avoid the introduction of any atoms that do not blend into the current chemistry of the system. For example, the use of an oxidizer, such as oxygen compounded with say nitrogen, will introduce oxygen into the system. Sodium combines most readily with oxygen and moten sodium with some sodium oxide dissolved therein is most corrosive.

As is now publicly disclosed, there has never been a fusion explosion of any magnitude that has not been initiated by a fission explosion. If such a means is to be employed in the sub-kiloton size of explosions which would be used in contained explosion systems, there becomes the difficulty that most of the explosion resulting therefrom will be of fissioning. That is because the fusion-born neutrons will cause much more fissioning. Explicitly, if by very compressive means a fission explosion is producible by use of a kilogram of $Pu^{239}$ and but $\frac{1}{2}$% of said plutonium fissions and produces an explosion about equal to say 95 tons of TNT which ignites fusionable material. If there is then energy of 95 tons from such fusioning, there will be over three times as many neutrons produced as were produced by that fissioning, and those fusion neutrons have upwards of seven times the energy of the fission-born neutrons. These fusion-born neutrons will most likely be multiplied by the reflecting-tamping blanket probably substantially surrounding the fissioning material. Then it can be expected that those fusion-born neutrons and neutrons from neutron-multiplying reactions, such as reaction (3), will then cause much more fissioning in the remaining 99.5% of the kilogram of fissile material.

Although the time of a fission explosion might be timed in hundreds of nano-seconds, the timing of fusion explosions could be measured in nano-seconds. Thus, the neutrons from the fusion explosion will be reaching the fissile material long before it has been dispersed. That is, these fusion-born neutrons will be causing fissions when the configuration of fissile material has say a "k" of 0.90 or so. If such is the situation, there would be a further multiplication of fissioning by about ten times. In other words, even if only one-third of the fusion-born neutrons cause a fissioning, the resulting fissioning would be about ten times the initial 95 tons of energy.

Thus, it can be seen that where there is a kilogram or so of fissile material used to ignite some fusionable material, there will be a synergetic explosion wherein most of the energy will be from fissionings. (Unless the resulting explosion has a total energy measured in more than hundreds of kilotons.) In fact, it is commonly known from the field of weapons technology that where maximum blast is desired, the fission-fusion material of a large thermonuclear explosive is surrounded by a massive tamper of depleted uranium which is fast neutron fissioned by the fusion-born neutrons. This inexpensive tamper increases the total energy produced several-fold and the resulting debris is most radioactively "dirty".

Nuclear weapons are made to be used many months after manufacture and under changing and different environmental conditions. Also, the resulting pollution from materials therein are of no consequence. On the other hand, peaceful nuclear explosives used within containing chambers are made at the longest a few minutes before use in "constant" environmental conditions (the inside of the containing chamber). There is every effort to avoid introducing other atoms into the milieu of the reactor system.

With a contained nuclear explosion reactor system, it is possible to have a very massive and most expensive fusion ignition means that is external of the explosion containing chamber and is reusable. Such means would be most absurd for military situations but for peaceful production of energy and fissile materials, it is most economical (in cost per unit of energy and fissile material produced) and practical. Such means could produce most powerful pulses of photons (from laser systems), ions, electrons, and/or neutralized beams of particles which can cause the ignition of a small target of fusional material.

It is possible that a very small mass of fissile material can be so compressed that it can be caused to become a "micro" fission explosion that could cause surrounding fusionable material to be ignited into a larger and synergetic explosion, etc. It should be noted that deuterium-tritide near a "micro-fission explosion" would act as a neutron-reflector and as a neutron multiplier (reaction 1) even more so if they were compressed also. Note that such fissile atoms as $U^{233}$ and $Pu^{239}$ form most dense hydrides which might find use in such synergetic ignition means.

Chemical explosive means, such as are used in nuclear weapons, might cause a density doubling which reduces the critical mass to a fourth of its normal value. Most powerful pulses which cause outside layers to ablate outwardly and hence cause tremendous inward pressures could increase the density a hundred-fold or so. This means that a fission explosion could be produced with say a quarter-gram of fissile material! Even if most of such fissile material fissions, the quantity of energy produced would be on the order of three or so tons of TNT. It should be pointed out that the presence of many high Z atoms, such as actinides and/or fission products, greatly attentuates fusion reactions.

(8) The larger the explosion, the greater the economical advantage of a mostly fusion explosion because:
 (a) The ratio of expensive tritium to deuterium is lower in larger explosion systems;
 (b) The size of the different blankets, for optimum breeding, does not change much with greatly increased size of contained explosion; and
 (c) The cost of the fusion ignition system need not increase much with greatly increased final explosive power.

Thus, with contained explosions of greater magnitude, the factors which increase somewhat proportionally are the containing chamber, the heat-exchanging-precipitating means, and the quantity of very lean slurry with the equipment to pump it and to control its entry into the containing chamber.

Since the costs of fabrications, processings, and of fusion ignition does not increase appreciably with larger contained explosions, the larger contained explosion systems are more economical in per unit cost of useful energy output and in per unit cost of fissile isotope produced.

The factors limiting the maximum practical size of such systems are total cost, difficulty of effectively using so much energy in or from a single location, and the potential problems of having so much energy and fissile material coming from a single reactor system. Since there is a shock-blast from each contained explosion and for other reasons such systems would be placed in locations somewhat isolated from higher population densities.

The column-glob concept, as disclosed in this invention, can be used for the containment and energy absorption of nuclear explosion reactor systems of all-fission, fission-fusion, or all-fusion systems. Such an all-fusion (no actinide fissioning) reactor system could include the use of an all-fusion explosion contained by column-globs which contain lithium.

The use of massive column-globs and the apparatus herein disclosed is not limited to use for the containment of nuclear explosions in reactor systems. Such column-globs could be used in conjunction with programmed projectile-caused explosions. Such programmed explosions produce much useful thermal energy which can be withdrawn from the working fluid after it has been collected and passed through a heat-exchanging means. Such working fluid could be water-steam-water, sodium hydroxide, or with great care molten alkali metals, or even mixtures of compounds.

If powdered coal were contained within the water as a dense slurry in the centroidal portion whereat most of the kinetic energy of the meteor-material is converted into very high temperature gases, then there would be much production of carbon-monoxide gas and hydrogen gas by this endothermic reaction:

(10) $H_2O + C \rightarrow H_2 + CO$

Such gases, known as "water gas" could be used as fuels, or for further chemical purposes.

It is possible that such programmed projectile-explosions could be the means by which useful and valuable materials are delivered to a planet or moon. Since materials such as nickel, cobalt, and platinum are found in the metallic state in some meteoroid bodies and the delivery of such materials by projectile-explosion is much less costly than other means the use of column-globs of say mostly sodium hydroxide inside a containing chamber will be of much greater import than the energy produced thereby.

Thus, the use of column-globs, as disclosed in this invention, could be of use in contained fission explosions, in contained fission-fusion explosions, in contained all-fusion explosions (no actinide fissioning—but with fissioning of light atoms (such as D, Li-7, and/or Be), and in meteor-explosions within containing chambers.

It will be readily apparent from the foregoing Specification that modifications may be made to the reactor system and method disclosed therein without departing from the spirit and scope of this invention.

I claim:

1. A method of producing useful energy and isotopes, said method comprising the steps of:
   introducing an assembly of nuclear materials into a large containing chamber directed toward a center of nuclear reaction;
   causing said assembly of nuclear materials to produce intense nuclear reactions at said center of nuclear reaction;
   substantially surrounding said center of nuclear reaction with a first region of liquid in the form of at least one substantially contiguous free-falling mass of liquid; and
   substantially surrounding said first region with a second region of spray.

2. The method of claim 1 wherein said at least one mass has a mass density not substantially less than the mass density of said liquid.

3. The method of claim 1 or 2 wherein said liquid comprises a lean slurry of metallic actinide particles and other materials in molten alkalai metal.

4. The method of claim 3 wherein said other materials are selected from the group consisting of lithium, protium compounds, deuterium compounds and tritium compounds.

5. The method of claim 1 wherein the step of substantially surrounding said center of nuclear reaction comprises:
   positioning sealing means beneath a plurality of holding means;
   introducing liquid into each of said holding means to form a mass; and
   removing the sealing means from beneath each of said holding means at sufficient speed to prevent interference with the descent of each mass to form said first region.

6. The method of claim 1 wherein the step of introducing an assembly of nuclear materials comprises the steps of:
   introducing a subcritical mass into said chamber toward said center of nuclear reaction; and
   propelling first and second subcritical plugs into said chamber to engage said mass for assuring a more than prompt critical configuration.

7. The method of claim 6 wherein said mass has an opening therein and said first and second slugs are configured for insertion in said opening, and wherein said mass is gravitationally dropped into said chamber, said first slug is downwardly propelled for insertion into said opening with substantial velocity, and said second slug is upwardly propelled for insertion into said opening with substantial velocity substantially simultaneously with said first slug.

8. The method of claim 7 wherein each of said first and second slugs contains $UH_3$ at cryogenic temperature and the step of propelling said first and second slugs includes regulating magnetic fields for interaction with each of said first and second slug means for controlling the velocities thereof.

9. The method of claim 1 wherein said step of causing intense nuclear reactions includes producing a nuclear explosion at said center of nuclear reaction.

10. Apparatus for producing useful energy and isotopes, said apparatus comprising:
    a containing chamber having a center of nuclear reaction;
    an assembly of nuclear materials;
    means for introducing said assembly of nuclear materials into said chamber to produce intense nuclear reactions at said center of nuclear reaction;
    means for producing at least one contiguous free-falling mass of slurry for substantially surrounding said point of concurrence; and
    spray means for producing a configuration of actinide containing slurry spray in said chamber substantially surrounding said at least one mass of slurry.

11. The apparatus of claim 10 wherein said nuclear reactions include a nuclear explosion.

12. The apparatus of claim 10 wherein said assembly of nuclear materials comprises a subcritical mass, and first and second subcritical slug means which combine to form a more than prompt critical configuration.

13. The apparatus of claim 12 wherein said subcritical mass has a vertically aligned opening therethrough, and said first and second slug means are propelled for insertion into and collision in said opening.

14. Apparatus for producing useful energy, said apparatus comprising:
    a large chamber;
    means for introducing nuclear explosive means for descent into said chamber;
    means for causing an explosion of said nuclear explosive means at a predetermined point in said chamber;
    means for introducing a plurality of substantially contiguous free-falling liquid masses for descent into said chamber such that at the instant of nuclear explosion said nuclear explosive means is substantially surrounded by said plurality of masses; and
    means for introducing spray into said chamber.

15. Apparatus as in claim 14 wherein for each of said liquid masses said liquid mass introducing means comprises:
    hollow means positioned above said chamber and having an open lower end portion;
    means for closing the lower end portion of said hollow means;
    means for introducing liquid into said hollow means; and
    means for withdrawing said closing means from the lower end portion of said hollow means to permit said liquid to fall into said chamber in a large liquid mass.

16. Apparatus as in claim 15 wherein said closing means comprises:

plug means for engaging said hollow means lower end portion;

arcuate leg means extending from said plug means;

means for interacting with said leg means to withdraw said plug means from said hollow means lower end portion.

17. Apparatus as in claim 16 wherein said closing means includes latching means for holding said plug means against said hollow means lower end portion.

18. Apparatus as in claim 17 wherein said latching means comprises:

means for engaging said arcuate leg means when plug means is engaging said hollow means lower end portion; and means for disengaging said engaging means upon withdrawal of said plug means.

19. Apparatus as in claim 17 or 18 wherein said hollow means has a wall and said latching means includes:

means extending through said hollow means wall for engaging an edge of said plug means during engagement of said hollow means lower end portion; and means for downwardly displacing said extending means for disengagement of said plug means upon withdrawal of said plug means.

20. Apparatus as in claim 15 wherein said closing means comprises plug means extending diagonally from said hollow means and having a first end portion for engaging said hollow means lower end portion and a second end portion extending through a wall of said chamber.

21. Apparatus as in claim 14 including means for withdrawing said liquids from said chamber after each explosion.

22. Apparatus as in claim 21 including means for extracting useful thermal energy and debris of said nuclear explosions from said withdrawn liquids.

23. Apparatus as in claim 14 wherein said means for producing a large centroidal nuclear explosion comprises:

subcritical structure means;

first and second subcritical slug means;

means for dropping said subcritical structure means into said chamber toward said reaction point; and means for propelling said first and second subcritical slug means for interacting with said subcritical structure means to produce a more than prompt critical configuration at said reaction point and at said reaction time.

24. Apparatus as in claim 23 wherein said subcritical structure means has an opening therethrough which is in substantial vertical alignment at said reaction point, and said slug propelling means comprises:

means for propelling said first subcritical slug means from above said chamber to enter an upper portion of said opening; and means for propelling said second subcritical slug means from below said chamber to enter a lower portion of said opening.

25. Apparatus as in claim 14 including means for withdrawing vapors and gases from said large chamber between said explosions such that at the instant of nuclear explosion there is a very low atmospheric pressure within said chamber.

26. A method of containing large nuclear explosions in a large containing chamber seriatim, said method comprising the steps of:

introducing a plurality of large substantially contiguous free-falling masses of liquid into the top portion of said containing chamber;

having said masses free-fall so that said masses substantially surround a centroidal nuclear explosion; and applying spray within said chamber but outside of the assembly of said masses and nuclear explosion means.

27. The method of claim 26 wherein said step of introducing each of said masses comprises the steps of:

positioning hollow means above said chamber;

releaseably sealing a lower portion of said hollow means;

inserting liquid into said hollow means; and releasing said liquid for descent in said chamber in a large liquid mass.

28. The method of claim 26 wherein the plurality of large substantially contiguous free-falling masses of liquid consists of a lesser plurality of inner free-falling masses and a greater plurality of outer free-falling masses.

29. The method of claim 26 wherein said centroidal nuclear explosion causes energetic interaction with said masses of liquid.

30. The method of claim 26 wherein said fluid consists of a lean slurry of actinide metals in molten alkali metal.

31. A method for producing a large substantially contiguous mass of liquid with a mass in excess of 10 tonnes that free-falls more than 10 meters into an explosion containing chamber with a volume in excess of 10,000 cubic meters and a very low atmospheric pressure, said method comprising:

positioning sealing means beneath a holding means;

introducing liquid into said holding means to form a contiguous mass of liquid; and removing the sealing means from beneath said holding means at sufficient speed to prevent interference with the descent of said mass.

32. Apparatus for producing a large substantially contiguous mass of liquid with a mass in excess of 10 tonnes for free-falling more than 10 meters into an explosion containing chamber of very low atmospheric pressure and of a volume in excess of 10,000 cubic meters, said apparatus comprising:

hollow means positioned above said chamber and having an open lower end portion;

means for closing the lower end portion of said hollow means;

means for introducing liquid into said hollow means; and means for withdrawing said closing means from the lower end portion of said hollow means to permit said liquid mass to fall into said chamber as a large contiguous mass of liquid.

33. Apparatus as in claim 32 wherein said closing means comprises:

plug means for engaging said hollow means lower end portion;

arcuate leg means extending from said plug means;

means for interacting with said leg means to withdraw said plug means from said hollow means lower end portion.

34. Apparatus as in claim 33 wherein said closing means includes latching means for holding said plug means against said hollow means lower end portion.

35. Apparatus as in claim 34 wherein said latching means comprises:
   means for engaging said arcuate leg means when plug means is engaging said hollow means lower end portion; and
   means for disengaging said engaging means upon withdrawal of said plug means.

36. Apparatus as in claim 34 or 35 wherein said hollow means has a wall and said latching means includes:
   means extending through said hollow means wall for engaging an edge of said plug means during engagement of said hollow means lower end portion; and
   means for downwardly displacing said extending means for disengagement of said plug means upon withdrawal of said plug means.

37. Apparatus as in claim 33 wherein said closing means comprises plug means extending diagonally from said hollow means and having a first end portion for engaging said hollow means lower end portion and a second end portion extending through a wall of said chamber.

38. Apparatus as in claim 32 wherein a wall of said hollow means is also on its other side the wall for a different hollow means.

39. Apparatus as in claim 32 wherein said hollow means is so shaped and the means of withdrawing siad closing means so quick that the said contiguous mass of liquid substantially retains the shape of the hollow means as it falls.

* * * * *